(12) United States Patent
Nishimine et al.

(10) Patent No.: US 10,124,787 B2
(45) Date of Patent: Nov. 13, 2018

(54) DRIVING SYSTEM FOR VEHICLE

(71) Applicant: TOYOTA JIDOSHA KABUSHIKI KAISHA, Toyota-shi, Aichi-ken (JP)

(72) Inventors: Akiko Nishimine, Toyota (JP); Eiji Ichioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/428,556

(22) Filed: Feb. 9, 2017

(65) Prior Publication Data

US 2017/0232950 A1 Aug. 17, 2017

(30) Foreign Application Priority Data

Feb. 17, 2016 (JP) ................................. 2016-028410

(51) Int. Cl.
*B60W 20/00* (2016.01)
*B60K 6/26* (2007.10)
*B60K 6/445* (2007.10)
*B60W 10/30* (2006.01)
*B60K 1/00* (2006.01)

(52) U.S. Cl.
CPC ............. *B60W 20/00* (2013.01); *B60K 6/26* (2013.01); *B60K 6/445* (2013.01); *B60W 10/30* (2013.01); *B60K 2001/006* (2013.01); *B60W 2520/10* (2013.01); *B60W 2540/10* (2013.01); *B60W 2540/12* (2013.01); *B60Y 2200/92* (2013.01); *B60Y 2300/60* (2013.01); *B60Y 2400/60* (2013.01); *B60Y 2400/87* (2013.01); *Y10S 903/906* (2013.01)

(58) Field of Classification Search
CPC .. B60W 20/00; B60W 10/30; B60W 2520/10; B60W 2540/10; B60W 2540/12; B60K 6/26; B60K 6/445; B60K 2001/006; B60Y 2200/92; B60Y 2300/60; B60Y 2400/60; B60Y 2400/87; Y10S 903/906
USPC .......................................................... 701/22
See application file for complete search history.

(56) References Cited

U.S. PATENT DOCUMENTS 6,110,072 A 8/2000 Harada et al.
2009/0088913 A1 4/2009 Oyama et al.
(Continued)

FOREIGN PATENT DOCUMENTS

JP 2000-018377 A 1/2000
JP 2007-022296 A 2/2007
(Continued)

*Primary Examiner* — Aaron L Troost
*Assistant Examiner* — Paula L Schneider
(74) *Attorney, Agent, or Firm* — Oliff PLC

(57) ABSTRACT

A rotation speed of an electric oil pump in the case where an accelerator operation amount falls within a predetermined range is controlled to a rotation speed lower than the rotation speed of the electric oil pump in the case where the accelerator operation amount falls outside the predetermined range. When the range outside the predetermined range of the accelerator operation amount is set to a range in which noise that occurs from a source other than the electric oil pump is large, noise that occurs from the electric oil pump is masked by the noise that occurs from a source other than the electric oil pump and becomes inconspicuous in this range even when the rotation speed of the electric oil pump increases.

7 Claims, 7 Drawing Sheets

(56) References Cited

U.S. PATENT DOCUMENTS

2012/0203416 A1* 8/2012 Yoshimura ............. B60K 6/445
                                                    701/22
2012/0247106 A1* 10/2012 Noda ....................... B60K 6/48
                                                    60/714
2013/0319366 A1* 12/2013 Karasawa ................ F01M 1/02
                                                    123/196 R

FOREIGN PATENT DOCUMENTS

| JP | 2007-198439 A | 8/2007 |
| JP | 2008-132806 A | 6/2008 |
| JP | 2014-141954 A | 8/2014 |
| JP | 2014-151738 A | 8/2014 |

* cited by examiner

DRIVING SYSTEM FOR VEHICLE

CROSS-REFERENCE TO RELATED APPLICATIONS

The disclosure of Japanese Patent Application No. 2016-028410 filed on Feb. 17, 2016 including the specification, drawings and abstract is incorporated herein by reference in its entirety.

BACKGROUND

1. Technical Field

The present disclosure relates to control over a driving system for a vehicle, the driving system including an electric motor that serves as a driving source for propelling a vehicle and an electric oil pump that supplies oil to a cooling and lubrication required portion including the electric motor.

2. Description of Related Art

There is known a driving system for a vehicle. The driving system includes an electric motor that serves as a vehicle driving source and an electric oil pump for supplying oil to a cooling and lubrication required portion including the electric motor. In the thus configured driving system, the electric motor is cooled and a gear mechanism, and the like, are lubricated by operating the electric oil pump in response to a traveling state of a vehicle.

Incidentally, as the electric oil pump operates, noise due to the operating sound of the electric oil pump occurs. As measures for noise, Japanese Patent Application Publication No. 2007-22296 (JP 2007-22296 A) describes that the operating range of an engine is controlled to a low rotation and high torque (a range in which noise is large) in proportion to a vehicle speed. In the low rotation and high torque range of the engine, generally, thermal efficiency is high, while noise is large. In response to this, since running noise increases as the vehicle speed increases, noise of the engine becomes inconspicuous because of the running noise, with the result that noise that is perceived by a driver is reduced. As described in JP 2007-22296 A, it is conceivable to make noise from the electric oil pump inconspicuous by operating the electric oil pump such that noise from the electric oil pump is hidden by running noise that increases in proportion to the vehicle speed.

However, when noise is made inconspicuous by running noise during traveling as described in JP 2007-22296 A, it is difficult to make noise from the electric oil pump inconspicuous in a low vehicle speed range. A lubrication system, and the like, that require operation of the electric oil pump need to be operated even at a low vehicle speed. However, if only running noise of the vehicle is provided as means for making noise that accompanies the operation of the electric oil pump inconspicuous, the operation of the electric oil pump is limited at a low vehicle speed, so the amount of oil that is supplied to the cooling and lubrication required portion can be insufficient. Alternatively, when the electric oil pump is controlled such that the amount of oil that is supplied to the cooling and lubrication required portion is ensured, noise from the electric oil pump is conspicuous in the low vehicle speed range.

SUMMARY

The present disclosure is contemplated against a backdrop of the above-described situation, and provides a driving system for a vehicle, the driving system including an electric motor that serves as a vehicle driving source, an electric oil pump for supplying oil to a cooling and lubrication required portion including the electric motor, and a controller that is able to ensure the amount of oil that is supplied by the electric oil pump while noise that occurs from the electric oil pump is made inconspicuous.

An aspect of the present disclosure provides a driving system for a vehicle. The driving system includes an electric motor, an electric oil pump and an oil pump controller. The electric motor is configured to function as a driving source of the vehicle. The electric oil pump is configured to supply oil to a cooling and lubrication required portion including the electric motor. The oil pump controller is configured to (i) supply oil to the cooling and lubrication required portion by driving the electric oil pump while the vehicle is traveling, and (ii) control a rotation speed of the electric oil pump when an accelerator operation amount of the vehicle falls within a predetermined range to a rotation speed lower than a rotation speed of the electric oil pump when the accelerator operation amount falls outside the predetermined range.

The magnitude of noise due to the operating sound of the electric motor and inverter that controls the electric motor varies in response to the accelerator operation amount. For example, when the accelerator operation amount is large and a required output of the electric motor is large, or when regeneration control over the electric motor, which is executed in the case where the accelerator operation amount is zero or close to zero, is being executed, a load on the electric motor increases, so noise that occurs from the electric motor and the inverter increases.

With the above-configured driving system, the rotation speed of the electric oil pump in the case where the accelerator operation amount falls within the predetermined range is controlled to a rotation speed lower than the rotation speed of the electric oil pump in the case where the accelerator operation amount falls outside the predetermined range. When the range outside the predetermined range of the accelerator operation amount is set to a range in which noise that occurs from a source other than the electric oil pump is large, noise that occurs from the electric oil pump is masked by the noise that occurs from a source other than the electric oil pump and becomes inconspicuous in this range even when the rotation speed of the electric oil pump increases. When the noise that occurs from a source other than the electric oil pump is large, generally, a load on the electric motor also increases, so it is required to actively supply oil to the electric motor. In response to this, since the electric oil pump is controlled at a high rotation speed, oil is actively supplied to the electric motor, and the cooling ability improves. On the other hand, when the range in which the accelerator operation amount falls within the predetermined range is set to a range in which noise that occurs from a source other than the electric oil pump is small, the rotation speed of the electric oil pump decreases, so, even when noise that occurs from a source other than the electric oil pump is small, noise that occurs from the electric oil pump also reduces. As a result, it is possible to make the noise that occurs from the electric oil pump inconspicuous. When noise that occurs from a source other than the electric oil pump is small, generally, a load on the electric motor is also small, so the amount of oil required to cool the electric motor also just needs to be small. Therefore, even when the rotation speed of the electric oil pump decreases, shortage of the amount of supplied oil is prevented.

In the driving system, the oil pump controller may be configured to set a lower limit threshold of the predetermined range of the accelerator operation amount to a value at which regeneration control over the electric motor is started.

With the thus configured driving system, the lower limit threshold of the predetermined range of the accelerator operation amount is set to a value at which regeneration control over the electric motor is started. When the accelerator operation amount becomes smaller than or equal to the lower limit threshold, regeneration control over the electric motor is started, and noise that occurs from the electric motor and the inverter increases. Therefore, it is possible to mask noise that occurs from the electric oil pump by the noise that occurs from the electric motor and the inverter and make the noise that occurs from the electric oil pump inconspicuous. That is, it is possible to drive the electric oil pump at a high rotation speed. During regeneration control over the electric motor, a load on the electric motor increases and the electric motor tends to generate heat. However, the electric oil pump is driven at a high rotation speed, so it is possible to improve the cooling ability by actively supply oil to the electric motor.

In the driving system, the oil pump controller may be configured to set the lower limit threshold of the predetermined range to zero.

With the thus configured driving system, the lower limit threshold of the predetermined range of the accelerator operation amount is set to zero. When the accelerator operation amount becomes zero, regeneration control over the electric motor is started, and noise that occurs from the electric motor and the inverter increases. Therefore, it is possible to mask noise that occurs from the electric oil pump by the noise that occurs from the electric motor and the inverter and make the noise that occurs from the electric oil pump inconspicuous. That is, it is possible to drive the electric oil pump at a high rotation speed. During regeneration control over the electric motor, a load on the electric motor increases, and the electric motor tends to generate heat. However, since the electric oil pump is driven at a high rotation speed, it is possible to improve the cooling ability by actively supplying oil to the electric motor.

In the driving system, the oil pump controller may be configured to change the rotation speed of the electric oil pump on the basis of whether a depression force on a brake pedal is larger than or equal to a threshold set in advance.

With the thus configured driving system, when the depression force on the brake pedal is small, noise that occurs during regeneration control over the electric motor is small; whereas, when the depression force on the brake pedal increases, noise that occurs during regeneration control increases. For this reason, the threshold of the depression force on the brake pedal, at which noise that occurs from the electric oil pump becomes inconspicuous because of noise that occurs during regeneration control, is set, and the rotation speed of the electric oil pump is changed on the basis of whether the depression force on the brake pedal is larger than or equal to the threshold. Thus, it is possible to drive the electric oil pump at an appropriate rotation speed while masking noise from the electric oil pump by the noise that occurs during regeneration control.

In the driving system, the oil pump controller may be configured to control the rotation speed of the electric oil pump to zero, when the accelerator operation amount falls within the predetermined range.

With the thus configured driving system, when the accelerator operation amount falls within the predetermined range, noise that occurs from the electric motor and the inverter reduces. At this time, when the rotation speed of the electric oil pump is controlled to zero, it is possible to completely eliminate noise that occurs from the electric oil pump.

In the driving system, the oil pump controller may be configured to control the rotation speed of the electric oil pump to zero, when an oil temperature of oil is higher than or equal to a predetermined oil temperature.

With the thus configured driving system, when the oil temperature of oil is higher than or equal to the predetermined oil temperature, the rotation speed of the electric oil pump is controlled to zero. Decreasing the rotation speed to zero further eliminates occurrence of noise from the electric oil pump, and provides a higher advantageous effect. However, when the oil temperature is low and the viscosity of oil is high, it takes time to supply oil to the cooling and lubrication required portion by driving the electric oil pump again after setting the rotation speed of the electric oil pump to zero. For this reason, only in the case of the oil temperature at which it is possible to quickly supply oil to the cooling and lubrication required portion from a state where the rotation speed of the electric oil pump is zero, the rotation speed of the electric oil pump is controlled to zero. Thus, it is possible to achieve both stable operation of the electric oil pump and measures against noise.

In the driving system, the oil pump controller may be configured to control the rotation speed of the electric oil pump in the case where the accelerator operation amount falls within the predetermined range to a rotation speed lower than the rotation speed of the electric oil pump in the case where the accelerator operation amount falls outside the predetermined range, when a vehicle speed becomes lower than or equal to a predetermined vehicle speed set in advance.

With the thus configured driving system, when the vehicle speed becomes lower than or equal to the predetermined vehicle speed, the rotation speed of the electric oil pump in the case where the accelerator operation amount falls within the predetermined range is controlled to a rotation speed lower than the rotation speed of the electric oil pump in the case where the accelerator operation amount falls outside the predetermined range. Therefore, even in a traveling state where running noise during traveling is small, it is possible to mask noise that occurs from the electric oil pump by noise that occurs from the electric motor, the inverter, and the like, and make the noise that occurs from the electric oil pump inconspicuous.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings. In the following embodiments, the drawings are simplified or modified as needed, and the scale ratio, shape and the like, of each portion are not always accurately drawn.

Figure 1:
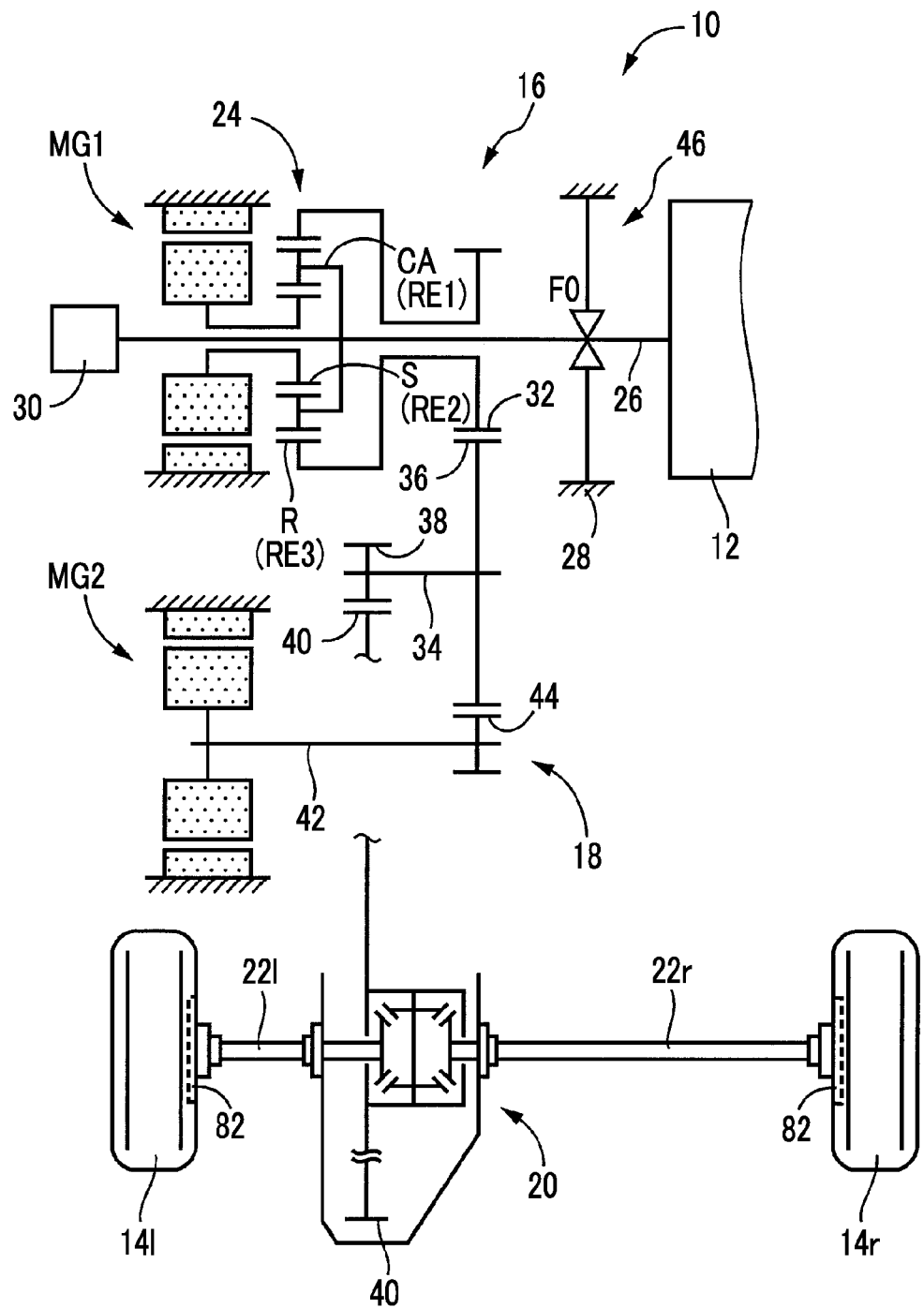
FIG. 1 is a skeletal view that illustrates the configuration of a hybrid vehicle driving system according to embodiments of the present disclosure.

FIG. 1 is a skeletal view that illustrates the configuration of a hybrid vehicle driving system 10 (hereinafter, simply referred to as driving system 10) that is part of a vehicle to which a first embodiment of the present disclosure is applied. The driving system 10 shown in FIG. 1 is suitably used in a front-engine front-drive (FF) vehicle. The driving system 10 includes a first driving unit 16 and a second driving unit 18. The first driving unit 16 includes an engine 12 and a first electric motor MG1. The engine 12 is a main driving force source. The second driving unit 18 includes a second electric motor MG2. The driving system 10 transmits power, which is output from the first driving unit 16 or the second driving unit 18, to a pair of right and left drive wheels 14r, 14l (hereinafter, when not specifically distinguished from each other, simply referred to as drive wheels 14) via a differential gear set 20 and a pair of right and left axles 22r, 22l (hereinafter, when not specifically distinguished from each other, simply referred to as axles 22). The first electric motor MG1 and the second electric motor MG2 are examples of the electric motor according to the present disclosure.

The engine 12 is, for example, an internal combustion engine, such as a gasoline engine and a diesel engine, which generates driving force as a result of combustion of fuel that is directly injected into a cylinder. The first driving unit 16 includes a planetary gear train 24 and the first electric motor MG1. The planetary gear train 24 includes three rotating elements, that is, a sun gear S, a carrier CA and a ring gear R. The first electric motor MG1 is coupled to the sun gear S of the planetary gear train 24. A one-way clutch F0 is provided between a crankshaft 26 and a housing (transaxle housing) 28. The crankshaft 26 is the output shaft of the engine 12. The housing 28 is a non-rotating member. The one-way clutch F0 permits rotation of the engine 12 in the forward rotation direction, and prevents rotation of the engine 12 in the reverse direction. Therefore, reverse rotation of the engine 12 is prevented by the one-way clutch F0.

The crankshaft 26 of the engine 12 is coupled to the carrier CA of the planetary gear train 24. The carrier CA serves as an input rotating member of the first driving unit 16. The crankshaft 26 is coupled to a mechanical oil pump 30. The ring gear R of the planetary gear train 24 is coupled to a first output gear 32. The ring gear R serves as an output rotating member. The first output gear 32 is coupled to the drive wheels 14 via a large-diameter gear 36, a small-diameter gear 38, the differential gear set 20 and the axles 22 such that power is transmittable. The sun gear S of the planetary gear train 24 is coupled to the first electric motor MG1. That is, the planetary gear train 24 is an example of a differential mechanism including the carrier CA, the sun gear S and the ring gear R. The carrier CA is coupled to the crankshaft 26 of the engine 12, and is coupled to the one-way clutch F0. The sun gear S is coupled to the first electric motor MG1. The ring gear R is the output rotating member.

The first output gear 32 is in mesh with the large-diameter gear 36. The large-diameter gear 36 is integrally provided with a counter shaft 34 parallel to the crankshaft 26 of the first driving unit 16. The small-diameter gear 38 integrally provided with the counter shaft 34 is in mesh with an input gear 40 of the differential gear set 20. The large-diameter gear 36 is in mesh with a second output gear 44. The second output gear 44 is coupled to an output shaft 42 of the second electric motor MG2. That is, the second electric motor MG2 is coupled to the drive wheels 14 via the second output gear 44, the large-diameter gear 36, the small-diameter gear 38, the differential gear set 20 and the axles 22 such that power is transmittable. Each of the first electric motor MG1 and the second electric motor MG2 is a motor generator having the function of a motor that generates driving force and the function of a generator that generates reaction force.

In the thus configured driving system 10, rotation output from the engine 12 in the first driving unit 16 is output from the first output gear 32 via the planetary gear train 24 that serves as the differential mechanism, and is input to the input gear 40 of the differential gear set 20 via the large-diameter gear 36 and the small-diameter gear 38 that are provided on the counter shaft 34.

Rotation of the first electric motor MG1 in the first driving unit 16 is transmitted to the first output gear 32 via the planetary gear train 24, and is transmitted to the input gear 40 of the differential gear set 20 via the large-diameter gear 36 and the small-diameter gear 38 that are provided on the counter shaft 34. Rotation of the second electric motor MG2 in the second driving unit 18 is transmitted to the large-diameter gear 36, which is provided on the counter shaft 34, via the output shaft 42 and the second output gear 44, and is transmitted to the input gear 40 of the differential gear set 20 via the large-diameter gear 36 and the small-diameter gear 38. In the driving system 10 according to the first embodiment, each of the engine 12, the first electric motor MG1 and the second electric motor MG2 is allowed to be used as a driving source for propelling the vehicle.

Figure 2:
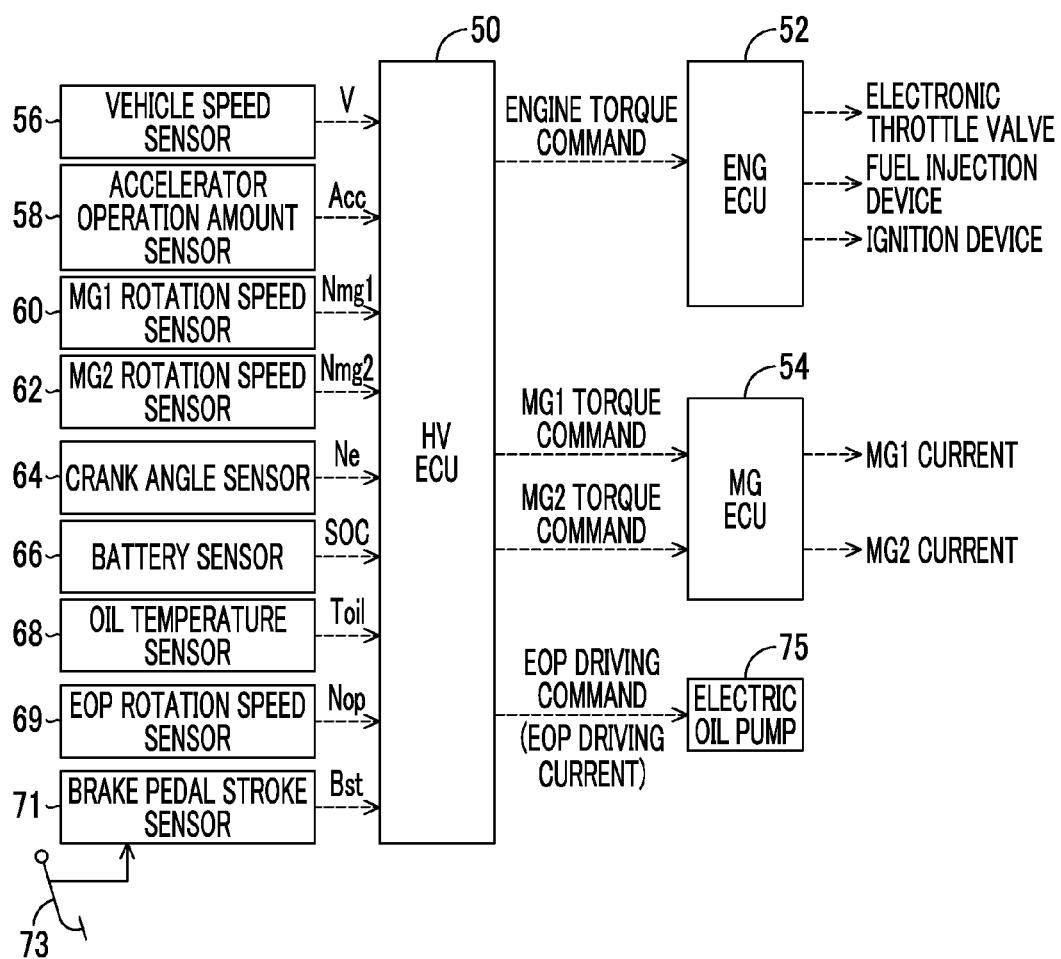
FIG. 2 is a view that illustrates a relevant portion of electrical system provided in order to control hybrid drive with the use of the vehicle driving system shown in FIG. 1.

FIG. 2 is a view that illustrates a relevant portion of electrical system provided in order to control hybrid drive with the use of the driving system 10. As shown in FIG. 2, the driving system 10, for example, includes a hybrid drive control electronic control unit 50 (HVECU or electronic control unit 50), an engine control electronic control unit 52 (ENGECU or electronic control unit 52) and an electric motor control electronic control unit 54 (MGECU or electronic control unit 54). Each of these electronic control units 50, 52, 54 includes a so-called microcomputer. The microcomputer includes a CPU, a ROM, a RAM, input/output interfaces, and the like. The electronic control units 50, 52, 54 execute various controls, such as hybrid drive control, with the use of the engine 12, the first electric motor MG1 and the second electric motor MG2 by executing signal processing in accordance with programs prestored in the ROM while utilizing a temporary storage function of the RAM. The electronic control unit 52 mainly executes drive control over the engine 12. The electronic control unit 54 mainly executes drive control over the first electric motor MG1 and the second electric motor MG2. The electronic control unit 50 executes drive control, and the like, over the whole driving system 10 via the electronic control units 52, 54. These electronic control units 50, 52, 54 do not always need to be provided as individual control units, and may be provided as an integral control unit. Each of the electronic control units 50, 52, 54 may be further split into individual control units.

As shown in FIG. 2, various signals are supplied to the electronic control unit 50 from various sensors, switches, and the like, provided at portions of the driving system 10. Specifically, a signal that indicates a vehicle speed V, a signal that indicates an accelerator operation amount Acc, a signal that indicates a rotation speed Nmg1 of the first electric motor MG1, a signal that indicates a rotation speed Nmg2 of the second electric motor MG2, a signal that indicates a rotation speed Ne of the engine 12, a signal that indicates a state of charge SOC, a signal that indicates an input limit value Win and an output limit value Wout, a signal that indicates an oil temperature Toil, a signal that indicates a rotation speed Nop of an electric oil pump 75, a signal that indicates a stroke Bst (operation amount) of a brake pedal 73, and the like, are supplied to the electronic control unit 50. The signal that indicates the vehicle speed V corresponds to the rotation speed Nout of the first output gear 32, and is transmitted from a vehicle speed sensor 56. The signal that indicates the accelerator operation amount Acc is the operation amount of an accelerator pedal from an accelerator operation amount sensor 58. The operation amount of the accelerator pedal corresponds to a driver's required output amount. The signal that indicates the rotation speed Nmg1 of the first electric motor MG1 is transmitted from an MG1 rotation speed sensor 60. The signal that indicates the rotation speed Nmg2 of the second electric motor MG2 is transmitted from an MG2 rotation speed sensor 62. The signal that indicates the rotation speed Ne of the engine 12 is transmitted from a crank angle sensor 64. The signal that indicates the state of charge SOC is the amount of electric power stored in a battery (electrical storage device) (not shown), and is transmitted from a battery sensor 66. The signal that indicates the input limit value Win and the output limit value Wout is an input/output limit value commensurate with the state of charge SOC. The signal that indicates the oil temperature Toil is the temperature of oil for cooling and lubrication, and is transmitted from an oil temperature sensor 68. The oil for cooling and lubrication is stored inside the driving system 10. The signal that indicates the rotation speed Nop of the electric oil pump 75 (described later) is transmitted from an EOP rotation speed sensor 69. The signal that indicates the stroke Bst (operation amount) of the brake pedal 73 is transmitted from a brake pedal stroke sensor 71.

Command signals for executing drive control over the engine 12, drive control over the first electric motor MG1 and drive control over the second electric motor MG2 are output from the electronic control unit 50 to the electronic control units 52, 54. That is, for example, a driving signal to a throttle actuator, a fuel supply amount signal, an ignition signal, and the like, are output to the electronic control unit 52 as an engine torque command. The driving signal to the throttle actuator is a signal for controlling the output of the engine 12 via an engine output control device 70 (see FIG. 3). The driving signal is used to operate the opening degree θth of an electronic throttle valve provided in an intake pipe of the engine 12. The fuel supply amount signal is used to control a fuel supply amount to the intake pipe, or the like, from a fuel injection device. The ignition signal provides an ignition device with a command on the ignition timing of the engine 12. A command signal for controlling electric energy that is supplied to the first electric motor MG1 is output to the electronic control unit 54 as an MG1 torque command. A command signal for controlling electric energy that is supplied to the second electric motor MG2 is output to the electronic control unit 54 as an MG2 torque command. The electric energy is supplied from the battery (not shown) to the first electric motor MG1 via a first inverter 72 (see FIG. 3), and the electric energy is supplied from the battery (not shown) to the second electric motor MG2 via a second inverter 74 (see FIG. 3). A driving current as a command to drive the electric oil pump 75 is output from the electronic control unit 50.

Figure 3:
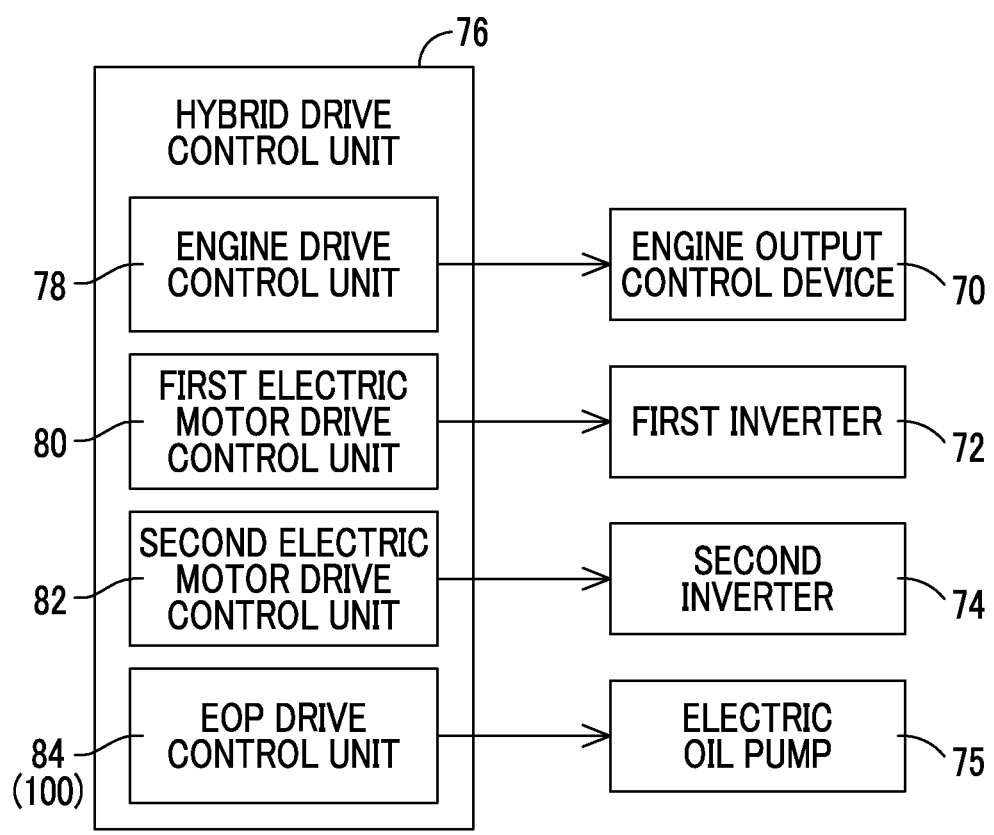
FIG. 3 is a functional block diagram that illustrates a relevant portion of control functions provided in electronic control units shown in FIG. 2.

FIG. 3 is a functional block diagram that illustrates a relevant portion of control functions provided in the electronic control units 50, 52, 54, and the like. A hybrid drive control unit 76 shown in FIG. 3 is functionally provided in the electronic control unit 50. These control functions may be provided in any one of the electronic control units 50, 52, 54. An engine drive control unit 78 included in the hybrid drive control unit 76 may be functionally provided in the electronic control unit 52. A first electric motor drive control unit 80 and a second electric motor drive control unit 82 are functionally provided in the electronic control unit 54. The hybrid drive control unit 76, the engine drive control unit 78, the first electric motor drive control unit 80 and the second electric motor drive control unit 82 may execute processing by transmitting and receiving information among the electronic control units 50, 52, 54.

The hybrid drive control unit 76 shown in FIG. 3 executes hybrid drive control over the driving system 10. Specifically, the hybrid drive control unit 76 controls the driving of the engine 12 via the engine output control device 70, and controls driving (motoring) or power generation (regeneration) of each of the first electric motor MG1 and the second electric motor MG2 via a corresponding one of the first inverter 72 and the second inverter 74. In order to execute such control, the hybrid drive control unit 76 includes the engine drive control unit 78, the first electric motor drive control unit 80, the second electric motor drive control unit 82 and an EOP drive control unit 84. The EOP drive control unit 84 is an example of the oil pump controller according to the present disclosure.

The engine drive control unit 78 controls the driving of the engine 12 via the engine output control device 70. Specifically, the driving signal to the throttle actuator, the fuel supply amount signal, the ignition signal, and the like, are supplied to the engine output control device 70 via the electronic control unit 52 such that the output of the engine 12 becomes a target engine output (a target rotation speed and a target output torque) that is calculated by the electronic control unit 50. The driving signal is a signal that is used to operate the opening degree θth of the electronic throttle valve provided in the intake pipe of the engine 12. The fuel supply amount signal is a signal that is used to control the fuel supply amount to the intake pipe, or the like, from the fuel injection device. The ignition signal is a signal that provides the ignition device with a command on the ignition timing of the engine 12.

The first electric motor drive control unit 80 controls the operation of the first electric motor MG1 via the first inverter 72. Specifically, the first electric motor drive control unit 80 supplies a signal to the first inverter 72 via the electronic control unit 54 such that the output of the first electric motor MG1 becomes a target first electric motor output (a target rotation speed and a target output torque). The signal is used to control the input and output of electric energy between the battery (not shown) and the first electric motor MG1. The target first electric motor output is calculated by the electronic control unit 50.

The second electric motor drive control unit 82 controls the operation of the second electric motor MG2 via the second inverter 74. Specifically, the second electric motor drive control unit 82 supplies a signal to the second inverter 74 via the electronic control unit 54 such that the output of the second electric motor MG2 becomes a target second electric motor output (a target rotation speed and a target output torque). The signal is used to control the input and output of electric energy between the battery (not shown) and the second electric motor MG2. The target second electric motor output is calculated by the electronic control unit 50.

The hybrid drive control unit 76 executes hybrid drive control with the use of the driving system 10 via the engine drive control unit 78, the first electric motor drive control unit 80 and the second electric motor drive control unit 82. For example, the hybrid drive control unit 76 calculates a required driving force Treq (required driving torque) on the basis of the accelerator operation amount Acc, the vehicle speed V, and the like, by consulting a map (not shown) stored in a predetermined storage device, and causes at least one of the engine 12, the first electric motor MG1 and the second electric motor MG2 to generate a required output such that the vehicle drives with a small amount of exhaust gas emission at a low fuel consumption in response to the calculated required driving force Treq. The accelerator operation amount Acc is detected by the accelerator operation amount sensor 58. The vehicle speed V is detected by the vehicle speed sensor 56. The required driving force Treq (required driving torque) is a target value of driving force (driving torque) to be transmitted to the drive wheels 14. For example, a motor drive mode (EV mode), an engine drive mode, a hybrid drive mode, or the like, is selectively established in response to the traveling state of the vehicle. The motor drive mode (EV mode) is a mode in which the engine 12 is stopped and the vehicle travels by using at least one of the first electric motor MG1 and the second electric motor MG2 as a driving source. The engine drive mode is a mode in which only the engine 12 is used as a driving source and the vehicle travels by mechanically transmitting the power of the engine 12 to the drive wheels 14. The hybrid drive mode is a mode in which the vehicle travels by using both the engine 12 and the second electric motor MG2 (or the first electric motor MG1 in addition to both the engine 12 and the second electric motor MG2) as driving sources.

The hybrid drive control unit 76 suitably executes control for changing the drive mode among the motor drive mode, the engine drive mode and the hybrid drive mode. The motor drive mode is a drive mode in which the engine 12 is stopped. The engine drive mode and the hybrid drive mode are drive modes in which the engine 12 is driven. For example, when the state of charge SOC of the battery (not shown) is higher than a predetermined threshold Sbo, the motor drive mode, which is the drive mode in which the engine 12 is stopped, is established. On the other hand, when the state of charge SOC is lower than or equal to the threshold Sbo, the engine drive mode or the hybrid drive mode, which is the drive mode in which the engine 12 is driven, is established. Control for changing the drive mode is executed on the basis of the accelerator operation amount Acc that is detected by the accelerator operation amount sensor 58, the vehicle speed V that is detected by the vehicle speed sensor 56, and the like.

The operation of the driving system 10 in the motor drive mode will be described. In the motor drive mode, the engine 12 is not driven, and the rotation speed of the engine 12 is set to zero. Specifically, rotation of the crankshaft 26 in the reverse direction is prevented by the one-way clutch F0 that functions as a lock mechanism, and rotation of the crankshaft 26 is set to a non-rotating state. In this state, the motoring torque of the second electric motor MG2 is transmitted to the drive wheels 14 as a driving force in a vehicle forward traveling direction. The motoring torque of the first electric motor MG1 is transmitted to the drive wheels 14 as a driving force in the vehicle forward traveling direction. That is, the rotation speed of the ring gear R that is an example of the output rotating member is increased in the forward rotation direction by using the motoring torque of the first electric motor MG1. In the driving system 10, the crankshaft 26 of the engine 12 is locked (fixed) by the one-way clutch F0 in zero rotation, so it is possible to use the first electric motor MG1 and the second electric motor MG2 as driving sources for propelling the vehicle together.

The operation of the driving system 10 in the engine drive mode or in the hybrid drive mode will be described. In the engine drive mode or in the hybrid drive mode, when reaction torque generated by the first electric motor MG1 is input to the sun gear S against the output torque of the engine 12, which is input to the carrier CA, the first electric motor MG1 is caused to function as a generator. When the rotation speed (output shaft rotation speed) of the ring gear R is constant, the rotation speed Ne of the engine 12 is allowed to be continuously (steplessly) varied by increasing or decreasing the rotation speed of the first electric motor MG1. That is, it is possible to execute control for setting the rotation speed Ne of the engine 12 to, for example, a rotation speed at which fuel efficiency is the highest through motoring control and reaction control over the first electric motor MG1. A hybrid system of this type is referred to as a mechanical distribution type or a split type.

As the drive mode is changed into the motor drive mode as a request to operate the electric oil pump 75, the EOP drive control unit 84 drives the electric oil pump 75 as needed. Oil pumped by the electric oil pump 75 is supplied via oil passages (not shown) to portions that need to be cooled and lubricated, such as the first electric motor MG1, the second electric motor MG2 (hereinafter, when not specifically distinguished from each other, referred to as electric motors MG) and the planetary gear train 24. That is, the electric oil pump 75 functions as an oil supply device for supplying oil to the electric motors MG, the planetary gear train 24, and the like, while the vehicle is traveling. The first electric motor MG1, the second electric motor MG2, and various meshing gears including the planetary gear train 24, are examples of the cooling and lubrication required portion according to the present disclosure.

The EOP drive control unit 84 stops the electric oil pump 75 while the vehicle is traveling in the engine drive mode or the hybrid drive mode, in which the engine 12 is driven. This is because, in the engine drive mode or the hybrid drive mode, the mechanical oil pump 30 is driven as the engine 12 is driven and oil pumped by the mechanical oil pump 30 is supplied to the electric motors MG, the planetary gear train 24, and the like, via the oil passages (not shown).

When the drive mode is changed into the motor drive mode, the EOP drive control unit 84 calculates a target rotation speed Nop* of the electric oil pump 75, and controls the driving current to the electric oil pump 75 such that the electric oil pump 75 is driven to rotate at the target rotation speed Nop*. The EOP drive control unit 84, for example, detects the rotation speed Nop of the electric oil pump 75 whenever necessary, and executes rotation speed control such that the actual rotation speed Nop follows the target rotation speed Nop*.

The EOP drive control unit 84 calculates the target rotation speed Nop* on the basis of the vehicle speed V, the accelerator operation amount Acc and the oil temperature Toil. The EOP drive control unit 84 determines whether the vehicle speed V is lower than or equal to a predetermined vehicle speed V1 set in advance.

As the vehicle speed V increases, running noise increases. Therefore, even when the electric oil pump 75 is driven to rotate at a high rotation speed, noise due to the operating sound of the electric oil pump 75 is smaller than the running noise, so the noise is masked by the running noise and becomes inconspicuous. The EOP drive control unit 84 determines whether the vehicle speed V is lower than or equal to the predetermined vehicle speed V1 set in advance. When the vehicle speed V exceeds the predetermined vehicle speed V1, the EOP drive control unit 84 sets the target rotation speed Nop* to a rotation speed A set in advance.

The predetermined vehicle speed V1 of the vehicle speed V is empirically or analytically obtained in advance. The predetermined vehicle speed V1 of the vehicle speed V is set to a value at which noise that occurs at the time when the electric oil pump 75 is driven to rotate at the rotation speed A is masked by the running noise and becomes inconspicuous while the vehicle is traveling. The rotation speed A of the electric oil pump 75 is also empirically or analytically obtained in advance. The rotation speed A of the electric oil pump 75 is set to a rotation speed at which it is possible to supply the amount of oil that is required to cool the electric motors MG and lubricate the various meshing gears.

Figure 4:
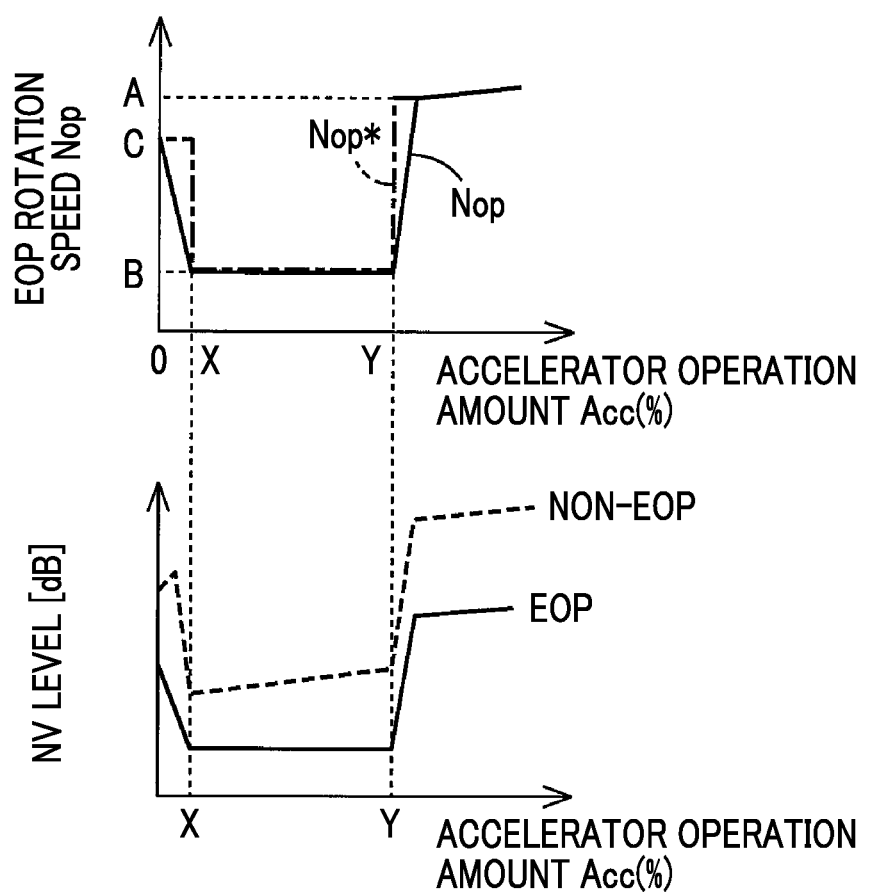
FIG. 4 is a view that shows the relationship between an accelerator operation amount and a rotation speed of an electric oil pump and the relationship between an accelerator operation amount and a magnitude of noise in the vehicle driving system according to the first embodiment of the present disclosure.

On the other hand, when the vehicle speed V falls within a range lower than or equal to the predetermined vehicle speed V1, the EOP drive control unit 84 determines the target rotation speed Nop* on the basis of the relationship (described later) obtained and stored in advance and shown in FIG. 4, and controls the electric oil pump 75 such that the rotation speed Nop of the electric oil pump 75 becomes the target rotation speed Nop*. The upper graph in FIG. 4 shows the relationship between an accelerator operation amount Acc and a rotation speed Nop of the electric oil pump 75. The abscissa axis represents the accelerator operation amount Acc. The ordinate axis represents the rotation speed Nop of the electric oil pump 75. The continuous line indicates the actual rotation speed Nop of the electric oil pump 75. The alternate long and short dashes line indicates the target rotation speed Nop*. As shown in FIG. 4, in the first embodiment, in the range in which the vehicle speed V is lower than or equal to the predetermined vehicle speed V1, the rotation speed Nop of the electric oil pump 75 is changed on the basis of the accelerator operation amount Acc.

As shown in FIG. 4, in the low vehicle speed range in which the vehicle speed V is lower than or equal to the predetermined vehicle speed V1, the target rotation speed Nop* is determined on the basis of the accelerator operation amount Acc. The target rotation speed Nop* indicated by the alternate long and short dashes line in the case where the accelerator operation amount Acc falls within the range from a predetermined value X to a predetermined value Y is set to a lower value than the target rotation speed Nop* in the case where the accelerator operation amount Acc falls within the range smaller than the predetermined value X or the range larger than the predetermined value Y. Therefore, the EOP drive control unit 84 controls the rotation speed Nop of the electric oil pump 75 in the case where the accelerator operation amount Acc falls within the range from the predetermined value X to the predetermined value Y to a rotation speed lower than the rotation speed Nop in the case where the accelerator operation amount Acc falls outside the range. The range of the accelerator operation amount Acc from the predetermined value X to the predetermined value Y is an example of the predetermined range according to the present disclosure.

As shown in FIG. 4, in the case where the accelerator operation amount Acc falls within the range from the predetermined value X to the predetermined value Y, the target rotation speed Nop* is set to a rotation speed B indicated by the alternate long and short dashes line. In the case where the accelerator operation amount Acc falls within the range larger than zero and smaller than the predetermined value X, the target rotation speed Nop* is set to a rotation speed C indicated by the alternate long and short dashes line and higher than the rotation speed B. Accordingly, the actual rotation speed Nop of the electric oil pump 75, indicated by the continuous line, steep decreases so as to follow the target rotation speed Nop*. The rotation speed C that is set in the case where the accelerator operation amount Acc is smaller than the predetermined value X corresponds to the case where a depression force BS on the brake pedal 73 exceeds a threshold F set in advance. The threshold F of the depression force BS on the brake pedal 73 will be described later. The depression force BS on the brake pedal 73 is calculated on the basis of a variation per unit time in the stroke Bst of the brake pedal 73. The stroke Bst is detected by the brake pedal stroke sensor. Alternatively, it is also possible to calculate the depression force BS on the brake pedal 73 on the basis of a hydraulic pressure applied to a hydraulic cylinder that is operatively coupled to the brake pedal 73.

The rotation speed B is empirically or analytically obtained in advance. In a traveling state where the accelerator operation amount Acc falls within the range from the predetermined value X to the predetermined value Y, the rotation speed B is set to a rotation speed at which it is possible to supply the amount of oil required from the electric motors MG, and the like, within the range in which noise that occurs from the electric oil pump 75 is masked by noise that occurs from sources other than the electric oil pump 75 and becomes inconspicuous. The noise that occurs from sources other than the electric oil pump 75 includes noise due to the operating sound of the first electric motor MG1, first inverter 72, second electric motor MG2, second inverter 74, and the like, and noise that occurs from the meshing gears including the planetary gear train 24. The rotation speed C is also empirically or analytically obtained in advance. The rotation speed C is set to a rotation speed at which it is possible to supply the amount of oil required against heat generation due to regeneration control over the second electric motor MG2 within the range in which noise that occurs from the electric oil pump 75 is masked by noise that occurs from sources other than the electric oil pump 75, including noise due to regeneration control over the second electric motor MG2 and becomes inconspicuous.

In the case where the accelerator operation amount Acc is larger than zero and smaller than the predetermined value X, the brake pedal 73 can be depressed, and the amount of regeneration of the second electric motor MG2 varies depending on the depression force BS of the brake pedal 73. For example, when the brake pedal 73 is not depressed or depressed lightly, that is, when the depression force BS on the brake pedal 73 is small, the amount of regeneration during regeneration control is small, so noise that occurs from the second electric motor MG2 and the second inverter 74 is small. On the other hand, when the brake pedal 73 is depressed strongly, that is, when the depression force BS on the brake pedal 73 is large, the amount of regeneration during regeneration control is large, so noise that occurs from the second electric motor MG2 and the second inverter 74 is large.

In consideration of the above, in the first embodiment, the threshold F of the depression force BS on the brake pedal 73 is set, and, when the depression force BS is larger than or equal to the threshold F, the target rotation speed Nop* of the electric oil pump 75 is set to the rotation speed C. When the depression force BS on the brake pedal 73 is smaller than the threshold F, the target rotation speed Nop* of the electric oil pump 75 is changed between the rotation speed B and the rotation speed C in response to the depression force BS on the brake pedal 73. Specifically, as the depression force BS on the brake pedal 73 increases, the target rotation speed Nop* is set to a larger value (the maximum value is the rotation speed C). The threshold F of the depression force BS on the brake pedal 73 is empirically or analytically obtained in advance. The threshold F is set to a value at which regeneration noise during regeneration control is sufficiently large and noise from the electric oil pump 75 is masked by the regeneration noise and becomes inconspicuous.

The predetermined value X is set to a value close to zero. Specifically, the predetermined value X is set to a value at which the second electric motor MG2 is changed from drive control to regeneration control (a value at which regeneration control is started). When regeneration control over the second electric motor MG2 is executed, regeneration noise due to regeneration control occurs from the second electric motor MG2. Since this noise is sufficiently larger than noise that occurs from the electric oil pump 75, even when the rotation speed of the electric oil pump 75 increases, the noise that occurs from the electric oil pump 75 is masked by the regeneration noise that occurs from the second electric motor MG2. When regeneration control is set to start in the case where the accelerator operation amount Acc is zero, the predetermined value X may be zero. The predetermined value X is an example of the lower limit threshold of the predetermined range according to the present disclosure.

In the case where the accelerator operation amount Acc exceeds the predetermined value Y, the target rotation speed Nop* of the electric oil pump 75 is set to a rotation speed indicated by the alternate long and short dashes line and higher than the rotation speed B. The actual rotation speed Nop of the electric oil pump 75, indicated by the continuous line, steeply increases so as to follow the target rotation speed Nop*. In a high load range of the electric motors MG, in which the accelerator operation amount Acc exceeds the predetermined value Y, the rotation speed Nop is allowed to vary as indicated by the continuous line in FIG. 4 as a result of further executing rotation speed control based on the accelerator operation amount Acc, the vehicle speed V, and the like. The case where the accelerator operation amount Acc exceeds the predetermined value Y in the case where the vehicle speed V is lower than the predetermined vehicle speed V1 corresponds to, for example, a case where the vehicle is traveling on an uphill road, or the like.

The predetermined value Y is, for example, set to a point at which the driving of the first electric motor MG1 is started in addition to the driving of the second electric motor MG2. In the motor drive mode, basically, the vehicle is caused to travel by using the driving force of the second electric motor MG2; however, when the required driving force Treq is large, motoring torque is also output from the first electric motor MG1. At this time, noise also occurs from the first electric motor MG1 and the first inverter 72. Therefore, when the accelerator operation amount Acc exceeds the predetermined value Y, noise also occurs from the first electric motor MG1, so noise steeply increases. At this time, even when the electric oil pump 75 operates in a situation that the rotation speed Nop of the electric oil pump 75 is the rotation speed A higher than the rotation speed B, noise that occurs from the electric oil pump 75 is masked by noise that occurs from sources other than the electric oil pump 75, including noise from the first electric motor MG1, and becomes inconspicuous. The rotation speed A of the electric oil pump 75 is empirically obtained in advance. The rotation speed A is set to a rotation speed at which the amount of oil required is supplied to the electric motors MG, the planetary gear train 24, and the like, within the range in which noise that occurs from the electric oil pump 75 is masked by noise that occurs from sources other than the electric oil pump 75, including the first electric motor MG1 and the second electric motor MG2.

The lower graph in FIG. 4 shows a magnitude (NV level) of noise that occurs from the electric oil pump 75 (EOP) (hereinafter, EOP noise) and a magnitude of noise that occurs from sources other than the electric oil pump 75 (other than the EOP) (hereinafter, non-EOP noise). In FIG. 4, the dashed line indicates non-EOP noise, and the continuous line indicates EOP noise. The non-EOP noise in the lower graph of FIG. 4, for example, includes noise that occurs from the electric motors MG, noise that occurs from the inverters 72, 74, noise that occurs from the meshing gears that constitute the planetary gear train 24, and the like. The non-EOP noise does not include noise from the engine 12 since noise is measured in the motor drive mode in which the engine 12 is stopped.

As shown in FIG. 4, in the case where the accelerator operation amount Acc is larger than zero and smaller than the predetermined value X, non-EOP noise is large because of occurrence of noise due to regeneration control over the second electric motor MG2. In addition to this, EOP noise also increases as a result of an increase in the rotation speed of the electric oil pump 75; however, the EOP noise is sufficiently smaller than the non-EOP noise, so the noise that occurs from the electric oil pump 75 is masked by the non-EOP noise and becomes inconspicuous. Therefore, the driver does not experience a feeling of strangeness due to the noise from the electric oil pump 75. The amount of heat generation of the second electric motor MG2 also increases as a result of regeneration control over the second electric motor MG2. In response to this, the amount of oil supplied to the electric motors MG increases since the rotation speed Nop of the electric oil pump 75 is increased, so the ability to cool the electric motors MG improves.

In the case where the accelerator operation amount Acc falls within the range from the predetermined value X to the predetermined value Y, the second electric motor MG2 changes into a motoring side, and the accelerator operation amount Acc is also relatively small, so a load on the second electric motor MG2 is also small. Therefore, non-EOP noise reduces. In addition to this, since the electric oil pump 75 rotates at a low rotation speed (rotation speed B), noise that occurs from the electric oil pump 75 also reduces. Therefore, in the case where the accelerator operation amount Acc falls within the range from the predetermined value X to the predetermined value Y as well, EOP noise is masked by non-EOP noise and becomes inconspicuous, so the driver does not experience a feeling of strangeness due to the noise from the electric oil pump 75. Since the accelerator operation amount Acc is relatively small, a load on the second electric motor MG2 also reduces, so the amount of heat generation of the second electric motor MG2 also reduces. As a result, the amount of oil required to, for example, cool the second electric motor MG2 is also small. Therefore, the rotation speed Nop of the electric oil pump 75 may be low.

In the case where the accelerator operation amount Acc exceeds the predetermined value Y, since motoring torque is also output from the first electric motor MG1 in addition to motoring torque that is output from the second electric motor MG2, so non-EOP noise increases. In addition to this, EOP noise increases as a result of an increase in the rotation speed Nop of the electric oil pump 75; however, the EOP noise is sufficiently smaller than the non-EOP noise, so the EOP noise is masked by the non-EOP noise and becomes inconspicuous. Therefore, the driver does not experience a feeling of strangeness due to the noise from the electric oil pump 75. When the accelerator operation amount Acc exceeds the predetermined value Y, not only the second electric motor MG2 but also the first electric motor MG1 generates heat, so the amount of oil required to cool the electric motors MG increases. However, since the rotation speed Nop of the electric oil pump 75 is increased, the amount of oil supplied to the electric motors MG increases, so the ability to cool the electric motors MG improves. As a result, heat generation of the electric motors MG is reduced, so it is also possible to further extend a driving time of the first electric motor MG1 and second electric motor MG2.

In this way, the rotation speed of the electric oil pump 75 is changed in response to not only the vehicle speed V but also the accelerator operation amount Acc, so noise that occurs from the electric oil pump 75 is masked by noise that occurs from mainly the electric motors MG and becomes inconspicuous. As a result, the driver does not experience a feeling of strangeness due to the noise that occurs from the electric oil pump 75. In addition, the rotation speed Nop of the electric oil pump 75 is optimally controlled in response to the accelerator operation amount Acc, so shortage of oil supplied to the electric motors MG, and the like, is also prevented.

Figure 5:
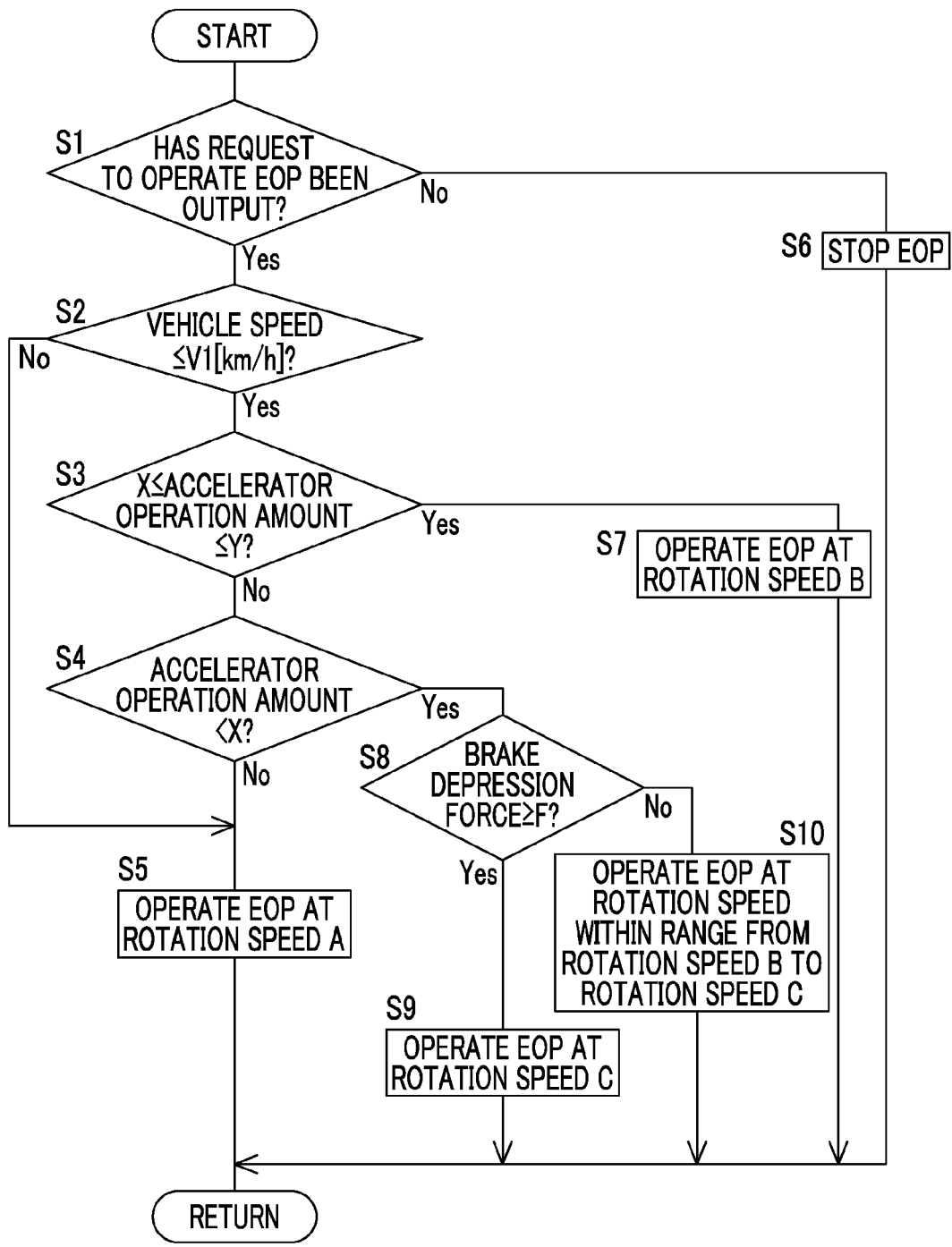
FIG. 5 is a flowchart that illustrates control operations of a controller over the electric oil pump in the vehicle driving system according to the first embodiment of the present disclosure.

FIG. 5 is a flowchart that illustrates control operations of the electronic control units 50, 52, 54 and, specifically, control operations over the electric oil pump 75. This flowchart is repeatedly executed while the vehicle is traveling.

Initially, in step S1 (hereinafter, step is omitted) corresponding to the function of the EOP drive control unit 84, it is determined whether a request to operate the electric oil pump 75 has been output. A request to operate the electric oil pump 75 is, for example, output when the drive mode has been changed into the motor drive mode. When a request to operate the electric oil pump 75 has not been output, negative determination is made in S1, and the process proceeds to S6. In S6 corresponding to the function of the EOP drive control unit 84, the electric oil pump 75 is stopped in the case where the electric oil pump 75 is operating. When the electric oil pump 75 has been already stopped, the process returns. When a request to operate the electric oil pump 75 has been output, affirmative determination is made in S1, and the process proceeds to S2.

In S2 corresponding to the function of the EOP drive control unit 84, it is determined whether the vehicle speed V is lower than or equal to the predetermined vehicle speed V1. When the vehicle speed V exceeds the predetermined vehicle speed V1, negative determination is made in S2, and the process proceeds to S5. When the vehicle speed V is lower than or equal to the predetermined vehicle speed V1, affirmative determination is made in S2, and the process proceeds to S3.

In S3 corresponding to the function of the EOP drive control unit 84, it is determined whether the accelerator operation amount Acc falls within the range from the predetermined value X to the predetermined value Y. When the accelerator operation amount Acc falls within the range from the predetermined value X to the predetermined value Y, affirmative determination is made in S3, and the process proceeds to S7. In S7 corresponding to the function of the EOP drive control unit 84, it is determined that noise that occurs from sources other than the electric oil pump 75 (non-EOP noise) is small, the target rotation speed Nop* of the electric oil pump 75 is set to the rotation speed B, and the electric oil pump 75 is controlled so as to operate at the rotation speed B. Thus, non-EOP noise reduces; however, noise that occurs from the electric oil pump 75 (EOP noise) also reduces, so the EOP noise is inconspicuous.

Referring back to S3, when the accelerator operation amount Acc falls outside the range from the predetermined value X to the predetermined value Y, the process proceeds to S4. In S4 corresponding to the function of the EOP drive control unit 84, it is determined whether the accelerator operation amount Acc is smaller than the predetermined value X. When the accelerator operation amount Acc is smaller than the predetermined value X, affirmative determination is made in S4, and the process proceeds to S8.

In S8 corresponding to the function of the EOP drive control unit 84, it is determined whether the depression force BS on the brake pedal 73 is larger than or equal to the threshold F set in advance. When the depression force BS on the brake pedal 73 is larger than or equal to the threshold F, affirmative determination is made in S8, and the process proceeds to S9. In S9 corresponding to the function of the EOP drive control unit 84, the target rotation speed Nop* of the electric oil pump 75 is set to the rotation speed C, and the electric oil pump 75 is controlled so as to operate at the rotation speed C. When the depression force BS on the brake pedal 73 is smaller than the threshold F in S8, negative determination is made in S8, and the process proceeds to S10. In S10 corresponding to the function of the EOP drive control unit 84, the target rotation speed Nop* of the electric oil pump 75 is set to a value between the rotation speed B and the rotation speed C in response to the depression force BS on the brake pedal 73, and the electric oil pump 75 is controlled so as to operate at the set rotation speed. In the case where the accelerator operation amount Acc is smaller than the predetermined value X, regeneration control over the second electric motor MG2 is executed, noise that occurs from the second electric motor MG2 (regeneration noise) increases, so EOP noise tends to be masked by noise from the second electric motor MG2, and the like. Therefore, when the electric oil pump 75 is controlled at the rotation speed between the rotation speed B and the rotation speed C as well, the EOP noise is masked by the non-EOP noise and becomes inconspicuous. Since the electric oil pump 75 is driven at the rotation speed higher than the rotation speed B, the amount of supplied oil increases against heat generation due to regeneration control over the second electric motor MG2, so the cooling ability improves.

Referring back to S4, when the accelerator operation amount Acc exceeds the predetermined value Y, negative determination is made in S4, and the process proceeds to S5. In S5 corresponding to the function of the EOP drive control unit 84, the target rotation speed Nop* of the electric oil pump 75 is set to the rotation speed A, and the electric oil pump 75 is controlled so as to be driven at the rotation speed A. When the accelerator operation amount Acc exceeds the predetermined value Y, not only the second electric motor MG2 but also the first electric motor MG1 outputs motoring torque, so noise that occurs from the electric motors MG increases. Thus, even when the electric oil pump 75 is controlled at the rotation speed A higher than the rotation speed B, EOP noise is masked by non-EOP noise and becomes inconspicuous. When negative determination is made in S2 as well, the electric oil pump 75 is controlled in S5 so as to operate at the rotation speed A. When negative determination is made in S2, the vehicle speed V is higher than the predetermined vehicle speed V1, and running noise is large, so EOP noise is masked by the running noise and becomes inconspicuous. Since the electric oil pump 75 is driven at the rotation speed A, the amount of oil supplied to the electric motors MG and the like, also increases.

As described above, according to the first embodiment, the rotation speed Nop of the electric oil pump 75 in the case where the accelerator operation amount Acc falls within the range from the predetermined value X to the predetermined value Y is controlled to a rotation speed lower than the rotation speed Nop of the electric oil pump 75 in the case where the accelerator operation amount Acc falls outside the range from the predetermined value X to the predetermined value Y. In the case where the accelerator operation amount Acc falls outside the range from the predetermined value X to the predetermined value Y, the rotation speed Nop of the electric oil pump 75 is high, so noise that occurs from the electric oil pump 75 also increases. In the case where the accelerator operation amount Acc falls outside the range from the predetermined value X to the predetermined value Y, noise from sources other than the electric oil pump 75 is large, so noise from the electric oil pump 75 is masked by the noise from sources other than the electric oil pump 75 and becomes inconspicuous. In the case where the accelerator operation amount Acc falls outside the range from the predetermined value X to the predetermined value Y, a load on the electric motors MG also increases, so oil needs to be actively supplied to the electric motors MG. However, since the electric oil pump 75 is controlled at a rotation speed higher than the rotation speed that is used in the case where the accelerator operation amount Acc falls within the range from the predetermined value X to the predetermined value Y, oil is actively supplied to the electric motors MG, so the cooling ability improves. On the other hand, in the case where the accelerator operation amount Acc falls within the range from the predetermined value X to the predetermined value Y, the rotation speed Nop of the electric oil pump 75 decreases, so noise from the electric oil pump 75 also reduces. In the case where the accelerator operation amount Acc falls within the range from the predetermined value X to the predetermined value Y, a load on the electric motors MG also reduces. Therefore, even when the rotation speed Nop of the electric oil pump 75 decreases, the amount of oil required to cool the electric motors MG reduces, so shortage of oil supplied is also prevented.

According to the first embodiment, when the accelerator operation amount Acc is smaller than the predetermined value X, regeneration control over the second electric motor MG2 is started, so noise that occurs from the second electric motor MG2 and the second inverter 74 increases. Therefore, it is possible to mask noise from the electric oil pump 75 by noise from sources other than the electric oil pump 75 and make the noise from the electric oil pump 75 inconspicuous. Therefore, it is possible to drive the electric oil pump 75 at a high rotation speed. During regeneration control over the second electric motor MG2, a load on the second electric motor MG2 increases, and heat tends to be generated. However, when the electric oil pump 75 is driven at the high rotation speed Nop, it is possible to actively supply oil to the second electric motor MG2 and improve the cooling ability.

According to the first embodiment, when the depression force BS on the brake pedal 73 is small, noise that occurs during regeneration control over the electric motor is small; whereas, when the depression force BS on the brake pedal 73 increases, noise that occurs during regeneration control increases. For this reason, the threshold F of the depression force BS on the brake pedal 73, at which noise that occurs from the electric oil pump 75 becomes inconspicuous because of noise that occurs during regeneration control, is set, and the target rotation speed Nop* of the electric oil pump 75 is changed on the basis of whether the depression force BS on the brake pedal 73 is larger than or equal to the threshold F. Thus, it is possible to drive the electric oil pump 75 at an appropriate rotation speed while masking noise from the electric oil pump 75 by noise that occurs during regeneration control.

According to the first embodiment, even when the vehicle speed V is lower than or equal to the predetermined vehicle speed V1 where running noise during traveling is small, it is possible to mask noise from the electric oil pump 75 by noise from sources other than the electric oil pump 75 and make the noise from the electric oil pump 75 inconspicuous.

Next, a second embodiment of the present disclosure will be described. In the following description, like reference numerals denote the same portions as those of the above-described first embodiment, and the description thereof is omitted.

In the second embodiment, in the case where the accelerator operation amount Acc falls within the range from the predetermined value X to the predetermined value Y, the target rotation speed Nop* of the electric oil pump 75 is set to zero. That is, the electric oil pump 75 is stopped. In the case where the accelerator operation amount Acc falls within the range from the predetermined value X to the predetermined value Y, a load on the electric motors MG, the meshing gears, and the like, reduces, so noise that occurs from sources other than the electric oil pump 75 reduces. Therefore, when noise suppression is given a higher priority, it is desirable to stop the electric oil pump 75 in the case where the accelerator operation amount Acc falls within the range from the predetermined value X to the predetermined value Y. An EOP drive control unit 100 (see FIG. 3) according to the second embodiment causes noise not to occur by setting the rotation speed Nop of the electric oil pump 75 to zero (by stopping the electric oil pump 75) in the case where the accelerator operation amount Acc falls within the range from the predetermined value X to the predetermined value Y.

Figure 6:
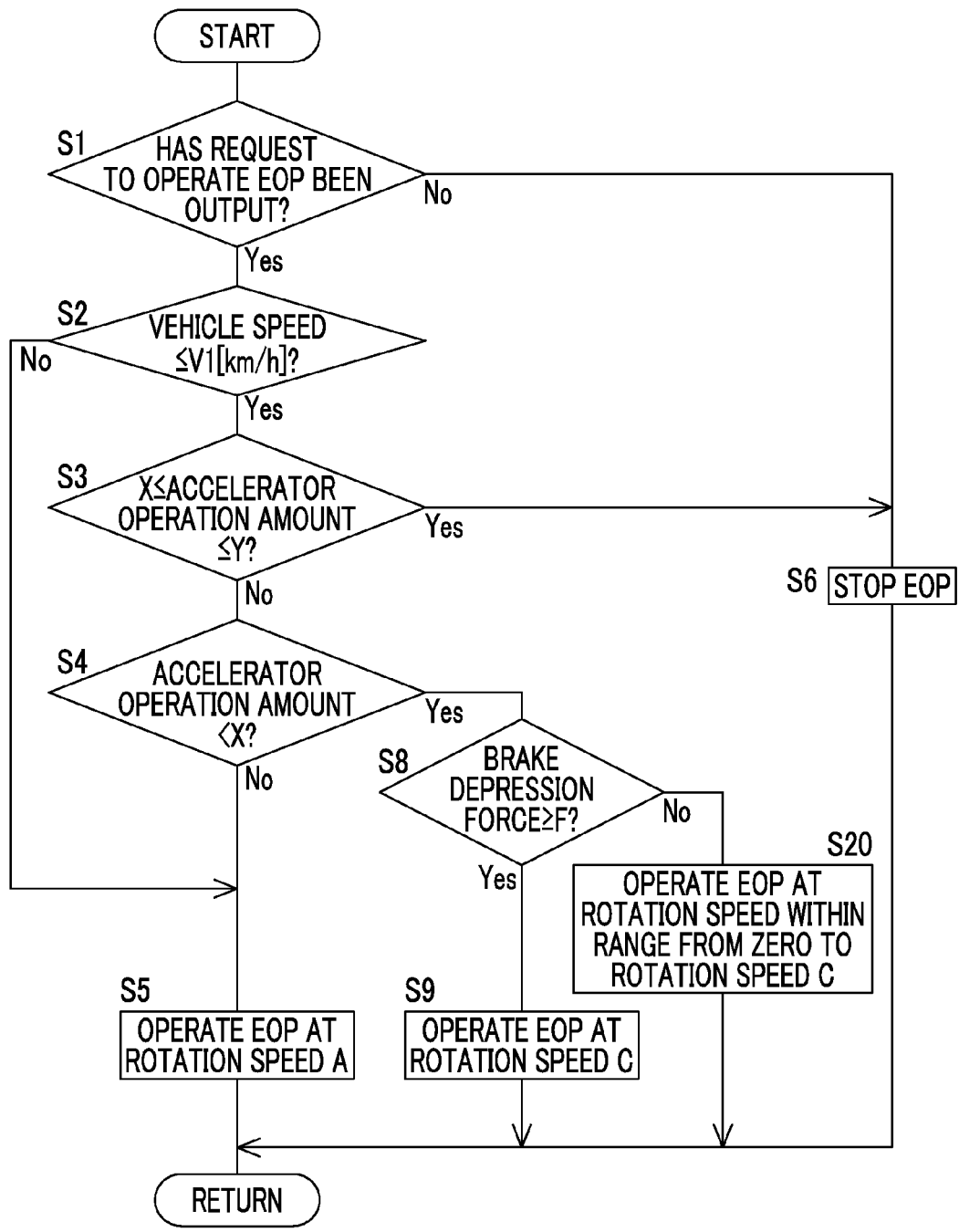
FIG. 6 is a flowchart that illustrates control operations of the controller over the electric oil pump in the vehicle driving system according to the second embodiment of the present disclosure.

FIG. 6 is a flowchart that shows control operations of electronic control units according to the second embodiment of the present disclosure and, specifically, a flowchart that illustrates control operations over the electric oil pump 75.

Initially, in step S1 (hereinafter, step is omitted) corresponding to the function of the EOP drive control unit 100 in the second embodiment, which corresponds to the EOP drive control unit 84 according to the first embodiment, it is determined whether a request to operate the electric oil pump 75 has been output. When a request to operate the electric oil pump 75 has not been output, negative determination is made in S1, and the process proceeds to S6. In S1, when a request to operate the electric oil pump 75 has been output, affirmative determination is made in S1, and the process proceeds to S2.

In S2 corresponding to the function of the EOP drive control unit 100, it is determined whether the vehicle speed V is lower than or equal to the predetermined vehicle speed V1. When the vehicle speed V exceeds the predetermined vehicle speed V1, negative determination is made in S2, and the process proceeds to S5. When the vehicle speed V is lower than or equal to the predetermined vehicle speed V1, affirmative determination is made in S2, and the process proceeds to S3.

In S3 corresponding to the function of the EOP drive control unit 100, it is determined whether the accelerator operation amount Acc falls within the range from the predetermined value X to the predetermined value Y. When the accelerator operation amount Acc falls within the range from the predetermined value X to the predetermined value Y, affirmative determination is made in S3, and the process proceeds to S6. In S6 corresponding to the function of the EOP drive control unit 100, the electric oil pump 75 is stopped (the rotation speed is set to zero). Therefore, noise does not occur from the electric oil pump 75. As a result, the influence of noise from the electric oil pump 75 does not occur.

Referring back to S3, when the accelerator operation amount Acc falls outside the range from the predetermined value X to the predetermined value Y, the process proceeds to S4. In S4 corresponding to the function of the EOP drive control unit 100, it is determined whether the accelerator operation amount Acc is smaller than the predetermined value X. When the accelerator operation amount Acc is smaller than the predetermined value X, affirmative determination is made in S4, and the process proceeds to S8.

In S8 corresponding to the function of the EOP drive control unit 100, it is determined whether the depression force BS on the brake pedal 73 is larger than or equal to the threshold F set in advance. When the depression force BS on the brake pedal 73 is larger than or equal to the threshold F, affirmative determination is made in S8, and the process proceeds to S9. In S9 corresponding to the function of the EOP drive control unit 100, the target rotation speed Nop* of the electric oil pump 75 is set to the rotation speed C, and the electric oil pump 75 is controlled so as to operate at the rotation speed C. When the depression force BS on the brake pedal 73 is smaller than the threshold F in S8, negative determination is made, and the process proceeds to S20. In S20 corresponding to the function of the EOP drive control unit 100, the target rotation speed Nop* of the electric oil pump 75 is set to a value between a rotation speed of zero and the rotation speed C in response to the depression force BS on the brake pedal 73, and the electric oil pump 75 is controlled so as to operate at the set rotation speed. When the accelerator operation amount Acc exceeds the predetermined value Y in S4, negative determination is made in S4, and the process proceeds to S5. In S5 corresponding to the function of the EOP drive control unit 100, the target rotation speed Nop* of the electric oil pump 75 is set to the rotation speed A, and the electric oil pump 75 is controlled so as to operate at the rotation speed A.

As described above, according to the second embodiment as well, similar advantageous effects to those of the above-described first embodiment are obtained. In the second embodiment, noise that occurs from the electric oil pump 75 is eliminated by setting the rotation speed Nop of the electric oil pump 75 to zero, that is, stopping the electric oil pump 75, in the case where the accelerator operation amount Acc falls within the range from the predetermined value X to the predetermined value Y. Thus, it is possible to reliably reduce a feeling of strangeness due to noise from the electric oil pump 75.

Next, a third embodiment of the present disclosure will be described. In the above-described first embodiment or second embodiment, in the case where the accelerator operation amount Acc falls within the range from the predetermined value X to the predetermined value Y, the rotation speed of the electric oil pump 75 is controlled to the rotation speed B or the electric oil pump 75 is stopped. In the third embodiment, the rotation speed of the electric oil pump 75 is changed depending on the oil temperature Toil in the case where the accelerator operation amount Acc falls within the range from the predetermined value X to the predetermined value Y.

Since the viscosity of oil is high in a state where the oil temperature Toil is low, it takes time to restart the electric oil pump 75 in a state where the electric oil pump 75 is stopped and supply oil to the electric motors MG, the meshing gears, and the like. On the other hand, since the viscosity of oil is low in a state where the oil temperature Toil is high, when the electric oil pump 75 is restarted in a state where the electric oil pump 75 is stopped, it is possible to quickly supply oil to the electric motors MG, the meshing gears, and the like. In consideration of this, in the third embodiment, the rotation speed D of the electric oil pump 75 is changed in response to the oil temperature Toil in the case where the accelerator operation amount Acc falls within the range from the predetermined value X to the predetermined value Y.

Figure 7:
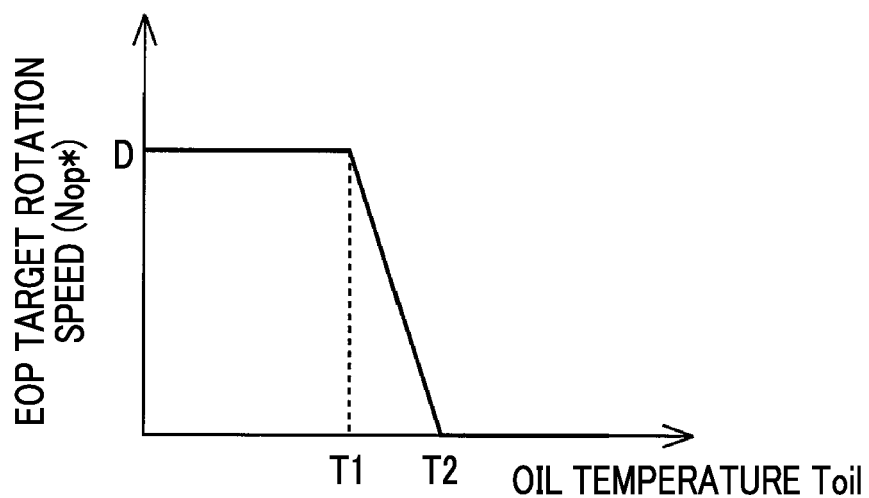
FIG. 7 is a view that shows the relationship between an oil temperature and a target rotation speed of the electric oil pump in the case where the accelerator operation amount falls within a predetermined range in the vehicle driving system according to the third embodiment of the present disclosure.

FIG. 7 shows the relationship between an oil temperature Toil and a target rotation speed Nop* of the electric oil pump 75 in the case where the accelerator operation amount Acc falls within the range from the predetermined value X to the predetermined value Y. In FIG. 7, the abscissa axis represents the oil temperature Toil, and the ordinate axis represents the target rotation speed Nop*.

As shown in FIG. 7, when the oil temperature Toil is lower than or equal to a predetermined oil temperature T1, the target rotation speed Nop* is set to the rotation speed D. The rotation speed D is empirically or analytically obtained in advance, and is set to a rotation speed at which it is possible to quickly supply oil to the electric motors MG, and the like, from a state where the electric oil pump 75 is stopped. In the range higher than the predetermined oil temperature T1, as the oil temperature Toil rises, the target rotation speed Nop* decreases. As the oil temperature Toil reaches a predetermined oil temperature T2, the target rotation speed Nop* is set to zero. In this way, the target rotation speed Nop* varies depending on the oil temperature Toil, and the target rotation speed Nop* is set to a lower value as the oil temperature Toil rises. The predetermined oil temperature T2 is an example of the predetermined oil temperature according to the present disclosure.

The predetermined oil temperatures T1, T2 for the oil temperature Toil are empirically or analytically obtained in advance. For example, the predetermined oil temperature T1 is set to a threshold within the range in which the electric oil pump 75 needs to be driven at the rotation speed D in consideration of the viscosity of oil. The predetermined oil temperature T2 is, for example, set to a value at which it is possible to supply oil to the electric motors MG, and the like, within a predetermined time at the time when the electric oil pump 75 is restarted from a state where the electric oil pump 75 is stopped.

As described above, in the case where the accelerator operation amount Acc falls within the range from the predetermined value X to the predetermined value Y, the target rotation speed Nop* of the electric oil pump 75 may be changed on the basis of the oil temperature Toil of oil. Even in the case set as described above, similar advantageous effects to those of the above-described first embodiment or second embodiment are obtained. By changing the target rotation speed Nop* of the electric oil pump 75 in response to the oil temperature Toil, the rotation speed Nop of the electric oil pump 75 is set to a further optimal value in response to the oil temperature Toil. Therefore, noise that occurs from the electric oil pump 75 is made inconspicuous, while shortage of oil supplied to the electric motors MG, and the like, is prevented.

Next, a fourth embodiment of the present disclosure will be described. In the above-described first to third embodiments, when the accelerator operation amount Acc becomes smaller than the predetermined value X, regeneration control over the second electric motor MG2 is executed. In the fourth embodiment, when the accelerator operation amount Acc becomes zero, regeneration control over the second electric motor MG2 is executed.

Figure 8:
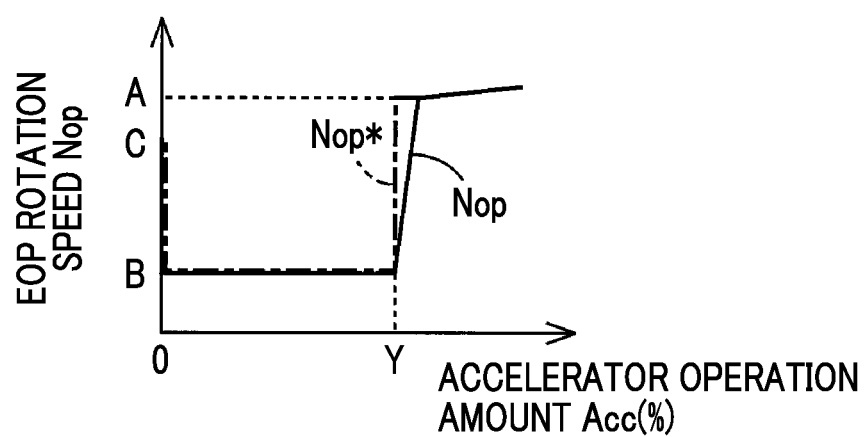
FIG. 8 is a view that shows the relationship between an accelerator operation amount and a rotation speed of the electric oil pump in the vehicle driving system according to the fourth embodiment of the present disclosure.

FIG. 8 shows the relationship between an accelerator operation amount Acc and a target rotation speed Nop* of the electric oil pump 75 according to the fourth embodiment. As shown in FIG. 8, a lower limit threshold of the range of the accelerator operation amount Acc, in which the target rotation speed Nop* of the electric oil pump 75 is set to the rotation speed B, is zero. When the accelerator operation amount Acc is zero, the target rotation speed Nop* of the electric oil pump 75 is set to the rotation speed C higher than the rotation speed B. In the fourth embodiment, when the accelerator operation amount Acc becomes zero, regeneration control over the second electric motor MG2 is executed. In addition to this, when the accelerator operation amount Acc becomes zero, the rotation speed of the electric oil pump 75 is increased. That is, when the accelerator operation amount Acc becomes zero, regeneration control over the second electric motor MG2 is executed, so noise due to regeneration control increases. Therefore, the rotation speed of the electric oil pump 75 is increased within the range in which noise from the electric oil pump 75 is masked by the noise due to the regeneration control.

Through control as described above as well, when the accelerator operation amount Acc becomes zero, noise from the second electric motor MG2 increases with regeneration control over the second electric motor MG2. Therefore, even when the rotation speed of the electric oil pump 75 is increased, noise that occurs from the electric oil pump 75 is masked by noise from other sources including the second electric motor MG2 and becomes inconspicuous. The amount of heat generation also increases during regeneration control over the second electric motor MG2. In this situation, the rotation speed of the electric oil pump 75 is also high, so it is possible to supply the amount of oil required to cool the second electric motor MG2. Therefore, according to the fourth embodiment as well, similar advantageous effects to those of the above-described first to third embodiments are obtained.

The embodiments of the present disclosure are described in detail with reference to the accompanying drawings; however, the present disclosure is also applied to another mode.

For example, in each of the above-described embodiments, the vehicle driving system 10 includes the first electric motor MG1, the second electric motor MG2, and the planetary gear train 24 that functions as a power distribution mechanism; however, the present disclosure is not always limited to the vehicle driving system 10. The present disclosure is applicable to a system where appropriate as long as the system includes an electric motor that serves as a vehicle driving source and an electric oil pump that supplies oil to the electric motor. For example, the present disclosure is also applicable to an electric vehicle that includes no engine.

In each of the above-described embodiments, the rotation speed Nop of the electric oil pump 75 is controlled to the rotation speed B that is a constant value in the case where the accelerator operation amount Acc falls within the range from the predetermined value X to the predetermined value Y; however, the rotation speed B is not always limited to a constant value. For example, the rotation speed Nop of the electric oil pump 75 may be changed as needed to a rotation speed that varies at a predetermined inclination in proportion to the accelerator operation amount Acc.

In the above-described second embodiment, in the case where the accelerator operation amount Acc falls within the range from the predetermined value X to the predetermined value Y, the electric oil pump 75 is stopped. Instead, timer control may be executed. For example, the electric oil pump 75 is driven at the rotation speed B when a predetermined time has elapsed from the time at which the electric oil pump 75 is stopped.

In the above-described third embodiment, in the case where the accelerator operation amount Acc falls within the range from the predetermined value X to the predetermined value Y, the rotation speed Nop of the electric oil pump 75 is changed in response to the oil temperature Toil. Instead, in the case where the accelerator operation amount Acc is smaller than the predetermined value X or exceeds the predetermined value Y as well, the rotation speed Nop of the electric oil pump 75 may be changed in response to the oil temperature Toil.

In each of the above-described embodiments, the rotation speed Nop of the electric oil pump 75 in the case where the vehicle speed V exceeds the predetermined vehicle speed V1 and the rotation speed Nop of the electric oil pump 75 in the case where the accelerator operation amount Acc exceeds the predetermined value Y both are set to the rotation speed A. Instead, these values do not need to be the same, and may be set to different values.

In each of the above-described embodiments, the target rotation speed Nop* of the electric oil pump 75 is varied between the case where the accelerator operation amount Acc is smaller than the predetermined value X and the case where the accelerator operation amount Acc exceeds the predetermined value Y. Instead, these target rotation speeds Nop* may be set to the same rotation speed. In this case, in the above-described flowcharts, step of determining whether the accelerator operation amount Acc is smaller than the predetermined value X is not required, so a load on the electronic control unit 50 is reduced.

In each of the above-described embodiments, the target rotation speed Nop* that is set in the case where the accelerator operation amount Acc is smaller than the predetermined value X is set to the rotation speed C, the target rotation speed Nop* that is set in the case where the accelerator operation amount Acc exceeds the predetermined value Y is set to the rotation speed A, and the rotation speed A is higher than the rotation speed C; however, the target rotation speed Nop* is not always limited to such settings. That is, the rotation speed C may be set to a value higher than the rotation speed A.

In each of the above-described embodiments, the mechanical oil pump 30 is not driven during operation of the electric oil pump 75. Instead, the mechanical oil pump 30 that is driven by the engine 12 may be driven during operation of the electric oil pump 75. In this case, non-EOP noise shown in FIG. 4, including noise from the engine 12, is considered.

The above-described embodiments are only illustrative. The present disclosure may be implemented in a mode including various modifications or improvements on the basis of the knowledge of persons skilled in the art.

What is claimed is:

1. A driving system for a vehicle, the driving system comprising:
   an electric motor configured to function as a driving source of the vehicle;
   an electric oil pump configured to supply oil to a cooling and lubrication required portion including the electric motor; and
   an oil pump controller configured to:
   (i) supply oil to the cooling and lubrication required portion by driving the electric oil pump while the vehicle is traveling, and
   (ii) control a rotation speed of the electric oil pump such that when an accelerator operation amount of the vehicle falls within a predetermined range, the rotation speed of the electric oil pump is lower than a rotation speed of the electric oil pump when the accelerator operation amount of the vehicle falls outside the predetermined range.

2. The driving system according to claim 1, wherein the oil pump controller is configured to set a lower limit threshold of the predetermined range of the accelerator operation amount to a value at which regeneration control over the electric motor is started.

3. The driving system according to claim 2, wherein the oil pump controller is configured to set the lower limit threshold of the predetermined range to zero.

4. The driving system according to claim 2, wherein the oil pump controller is configured to change the rotation speed of the electric oil pump on the basis of whether a depression force on a brake pedal is larger than or equal to a threshold set in advance when the accelerator operation amount is below the lower limit threshold.

5. The driving system according to claim 1, wherein the oil pump controller is configured to control the rotation speed of the electric oil pump to zero, when the accelerator operation amount falls within the predetermined range.

6. The driving system according to claim 5, wherein the oil pump controller is configured to control the rotation speed of the electric oil pump to zero, when the accelerator operation amount falls within a predetermined range and an oil temperature of oil is higher than or equal to a predetermined oil temperature, and to control the rotation speed of the electric oil pump to be greater than zero, when the accelerator operation amount falls within the predetermined range and the oil temperature is below the predetermined oil temperature.

7. The driving system according to claim 1, wherein the oil pump controller is configured to control the rotation speed of the electric oil pump when the accelerator operation amount falls within the predetermined range to a rotation speed lower than the rotation speed of the electric oil pump when the accelerator operation amount falls outside the predetermined range, when a vehicle speed becomes lower than or equal to a predetermined vehicle speed set in advance.

* * * * *